United States Patent Office 2,801,938
Patented Aug. 6, 1957

2,801,938

TREATING PAPER WITH SILICA SOL, AND PRODUCT PRODUCED

Ralph K. Iler, Brandywine Hundred, Del., assignor to E. I. du Pont de Nemours and Company, Wilmington, Del., a corporation of Delaware No Drawing. Application May 12, 1953,
Serial No. 354,635

2 Claims. (Cl. 117—152)

This invention relates to the impregnation of paper with colloidal silica and is more particularly directed to processes in which fibrous, cellulosic paper is impregnated with an alkali-stabilized colloidal silica solution and the silica is thereafter irreversibly attached to the fibers of the paper, and is further directed to the treated paper product so produced. The manner of attachment of the silica to the fibers of the paper is such that, after the paper containing the silica has been dried, the silica is not leached out by rewetting or soaking with water, and in this sense the attachment is said to be "irreversible."

This application is a continuation-in-part of my copending United States application Serial No. 664,690, filed April 24, 1946, and now abandoned.

Various methods have hitherto been proposed for treating paper with silicates or silica, but such methods have been characterized by using compositions which contained a large proportion of sodium or other alkali metal cations. The silicate or silica was present as precipitated gel dispersed throughout the paper as more or less discrete particles of substantial size. As a consequence the finished paper had a heterogeneous composition and was hard, brittle, and tended to be lacking in strength.

Attempts have also been made to treat paper with aqueous systems containing silica, but all of the silicic acid compositions which it has hitherto been proposed to use have been products which are unstable and which gel upon standing. Moreover, the methods proposed for applying such materials to paper have been such as tend to accelerate the gelling action prior to thorough impregnation of paper. As a consequence the treated paper product produced has resembled the product obtained by applying gelled products derived from sodium silicate or by applying sodium silicate and gelling it in the interstices of the paper by acid treatment.

Now according to the present invention it has been found that paper having remarkably improved qualities such as increased strength, decreased brittleness and greater resistance to scuffing may be produced by processes in which a pre-formed, fibrous cellulosic paper sheet is impregnated with an aqueous, stabilized colloidal silica solution and the silica is irreversibly attached to the fibers of the paper.

In describing this invention the term "paper" is used in its usual and ordinary meaning and will be understood to include cellulosic paper in the course of its manufacture, after the sheet has been formed and the water content has been reduced to below about 50 percent. Also included is paper of substantial thickness such as may commonly be referred to as paperboard, pasteboard, cardboard, or fiberboard.

The stabilized colloidal silica solutions which can be used according to this invention are characterized by containing silica in the form of partcles having an ultimate particle size not exceeding about 130 millimicrons, preferably less than 50 millimicrons, and more preferably in the range from 10 to 30 millimicrons. By "ultimate particle size" is meant the average particle present when the solution is diluted to about .1 percent $SiO_2$ with water and dried in a very thin layer deposit. Additionally, the silica solutions are characterized by having alkali ions so disposed around the surface of the particles as to prevent condensation between the particles by oxolation in aqueous solution at a concentration not exceeding about 45 percent $SiO_2$ by weight.

It is possible to prepare silicic acid solutions in which the silicic acid exists as low molecular weight polymers of the theoretical orthosilicic acid $Si(OH)_4$. However, a condensation reaction rapidly occurs whereby water splits out between hydroxyl groups attached to silicon atoms forming an Si—O—Si linkage and producing a higher polymer. This process, referred to as "oxolation" may continue indefinitely and in such a manner that the silicic acid solution rapidly sets up to a gel, the oxolation occurring between externally disposed hydroxyls, i. e., hydroxyls not already inactivated by being inwardly located within a siloxane ring or micelle. It has been found, however, that it is possible to retard such polymerization by forming a layer of alkali ions around the particles of such polysilicic acid while the latter is still in an aqueous sol.

The stabilization of a silica sol with sodium ions may be accomplished, for instance, by procedures such as described in United States Patent 2,244,325 to Bird. However, in order to produce stable solutions with a minimum of stabilizing agent such as alkali, the polymerization of the silicic acid may be carried to relatively high molecular weight so as to produce large molecules or colloidal particles which then retain only a small percentage of the reactive hydroxy groups originally present, and which thus require only a small amount of alkali as stabilizer. On the other hand, the polymerization must not proceed to the formation of a gel. If sodium hydroxide is used as the alkali in aqueous solution, it leaves a negative charge on the silica particles so that they mutually repel each other and the surface hydroxyl groups which remain on the surface of the particles thus have little opportunity to oxolate and bond the particles together into still larger units.

The aqueous, stabilized colloidal silica solutions with which paper is treated according to this invention are therefore characterized by containing silica in the form of particles having an ultimate size of about from 10 to 130 millimicrons and by having alkali ions so disposed around the surface of the particles as to prevent condensation between the particles by oxolation in aqueous solution at a concentration not exceeding about 45 percent $SiO_2$ by weight. The proportion of alkali ions required to stabilize a silica sol for use in this invention depends upon the size of the silica particles as above-mentioned, and upon other factors to be described hereinafter. This proportion of alkali can be stated conveniently as the weight ratio of total silica, expressed as $SiO_2$, to total alkali, expressed as $Na_2O$. The alkali, although expressed in the ratio as $Na_2O$, can be present as a base of another alkali metal or as a nitrogen base such as ammonia. In such a case, the weight of the base actually present is calculated to a weight of $Na_2O$ which is equivalent on the basis of alkalinity. This is a simple molar equivalence; for example, 94 parts by weight of $K_2O$ is equivalent to 62 parts by weight of $Na_2O$. As a practical matter the alkalinity present is easily determined by a volumetric titration with a standard acid, and the acid used is readily calculated to $Na_2O$. Organic bases, such as morpholine, may be expressed as $Na_2O$ by calculation from such a standard acid titration.

A very practical method for producing stabilized aqueous colloidal silica solution consists in passing a sodium silicate solution through an acid-regenerated ion exchange resin as described in the above-mentioned Bird patent whereby sodium ions are removed from the sodium silicate and replaced with hydrogen ions. In this instance the sodium ions may be completely removed and then sodium hydroxide may be added to furnish the necessary sodium ions.

A particular stabilized aqueous colloidal silica solution which may be used for treating paper with especial advantage according to a process of this invention is described in the Bird patent at page 2, column 1, lines 12 to 68. As stated in the Bird patent for a silica sol produced in this manner the weight ratio of $SiO_2$ to $Na_2O$ may be as high as from 75 to 100:1 and as low as 10:1, but ratios of 40:1 and 50:1 give superior results and are preferred. The higher the ratio, of course, the lower will be the number of sodium ions present. If desired, the pH of a sol prepared as described by Bird may be adjusted downwardly to, say, 3.5 to 5.5 before applying the sol to paper.

A stabilized sol containing larger ultimate particles and hence effective at a higher $SiO_2:Na_2O$ ratio can be prepared by a process comprising building up the size of particles in an aqueous silica sol by heating to from 60° C. to about the boiling temperature at atmospheric pressure a heel consisting of an aqueous sol of silica particles, the sol, after heating, having a relative viscosity of from 1.15 to 1.60 at 10 percent $SiO_2$, adding to said heel a silica sol containing particles of less than 10 millimicrons diameter, and continuing the addition and heating until at least 5 times as much silica has been added to the heel as was originally present, all as described in United States Patent 2,574,902 to Bechtold and Snyder. Such sols have a silica:alkali ratio of from 60:1 to 130:1, and have an average particle diameter in the range from 10 to 130 millimicrons. The sols can be highly concentrated, containing as much as 35 percent $SiO_2$ by weight, but preferably are diluted to a lower concentration before using for the impregnation of paper according to this invention.

By removing substantially all traces of electrolytes except the stabilizing alkali from built-up silica sols prepared as just described, sols which are stable at silica:alkali ratios of 130:1 to 500:1 can be produced, as more fully disclosed in United States Patent 2,577,485 to J. M. Rule. Such sols are stable at concentrations up to 50 percent $SiO_2$ by weight and hence are especially advantageous to transport and handle, but again, are preferably diluted before use in impregnating paper in accordance with the present invention. The average size of silica particles in the sols is in the range from 10 to 130 millimicrons.

The stabilized colloidal silica solution may be applied in either dilute or fairly concentrated form and may be applied to the paper according to methods with which the art is already familiar in connection with the application of sodium silicate to paper. Thus, the sheet may be immersed in the solution or the solution may be applied from a transfer roll, by spraying, or by other mechanical applicators. The silica content of the finished paper may be from 0.5 to 25 percent $SiO_2$ by weight, from 0.5 to 6.0 percent being preferred.

After the paper sheet has been impregnated with the colloidal silica soution the silica may be irreversibly combined with the paper by such methods as have hitherto been used for precipitating silica from sodium silicate solutions in paper. For instance, the silica may be irreversibly combined with the paper by subjecting the treated sheet to the action of an acid or an acidic salt, by evaporating the silica solution to dryness, or by heating the solution to a high temperature such as above about 60° C. at a concentration of $SiO_2$ in the solution above 45 percent.

The silica which is thus deposited in the paper is in the form of particles having an ultimate size less than about 130 millimicrons, and in the most preferred embodiment of the invention the ultimate particle size is from 10 to 30 millimicrons. The particles may be cemented together at their points of contact with each other, but as viewed in an electron microscope the individual identities of the particles are readily observable, and when reference is made to "ultimate" size in describing the silica in the paper products of this invention the term "ultimate" refers to the unit particles from which such cemented structures are built. In the paper, the ultimate particles of silica are deposited on the individual fibers, either separately or as cemented structures.

It has been found that when paper is treated with a colloidal silica solution containing 6 percent $SiO_2$ prepared according to the Bird patent, the ratio of $SiO_2$ to $Na_2O$ being about 40:1, and the paper is dried on a calendering roll the silica is present in the paper in an insoluble form, and is not leached out by further soaking in water. The $Na_2O$ is present in chemical association with the silica in the original ratio of 40:1. The silica is intimately associated with the individual fibers of the paper. By varying the $SiO_2:Na_2O$ ratio of the original silica solution applied to the paper from 10:1 to 100:1, the ratio of $SiO_2$ to $Na_2O$ in combination in the dried paper may be similarly varied.

It will be understood that various assistants commonly used in treating paper may be used in conjunction with the colloidal silica solutions. Thus, pigments such as titanium oxide, fillers such as clays, whiting, and wood flour, coating agents such as casein, waxes, gums, and the like, assistants such as wetting agents and penetrating agents and similar materials may be used.

The nature of this invention and its manner of application will be better understood by reference to the following illustrative examples.

Example 1

A quantity of paper having a soft, porous, water-absorptive structure was treated according to this invention by immersing it in an aqueous, stabilized colloidal silica solution prepared by passing a sodium silicate solution in contact with a mass of ion-exchange material which had been treated with an acidic reagent. The treated paper was dried for one hour at 110° C. The dried paper had improved strength, both wet and dry. The character of the treated paper was such that it was especially well adapted for use as paper toweling, blotting paper, and the like.

Example 2

A stabilized colloidal silica solution for use according to this invention was made up as described in the Bird Patent 2,244,325, page 2, column 1, lines 12 to 67. The sodium silicate used was a commercial grade having an $SiO_2:Na_2O$ weight percent ratio and a specific gravity of 42.5° Bé., and this was diluted to 2.2 percent $SiO_2$ before passing over the carbonaceous zeolite. The solution was passed over the zeolite until the ratio of $SiO_2$ to $Na_2O$ was approximately 50:1. The solution was then concentrated to 18 percent $SiO_2$ by open boiling at atmospheric pressure. In this 18 percent solution the silica was found to be stable indefinitely. For the purposes of this test the solution was diluted to 2 percent $SiO_2$ immediately before using.

A quantity of unsized, bleached 30 lb./ream kraft paper was treated with this silica solution by immersnig it for about five minutes. The paper was then withdrawn, passed through a ringer which was so adjusted that the amount of solution retained was equal to the dry weight of the paper, and the paper was dried in an oven at 105° C. for 15 minutes. The $SiO_2$ pick-up was found to be 9.1 percent by weight based on the original dry weight of paper.

The wet strength of the paper was measured by soaking the paper for about 2 minutes, then measuring the wet strength, both in the direction of the paper-making machine and in the cross direction on a laboratory tensile strength testing machine. The results were expressed as percentages of the strengths of the dry, untreated paper samples.

It was found that the wet strength of the treated paper was 28 percent of the original dry strength in the machine direction and 24 percent of the original strength in the cross direction, whereas the wet strength of untreated controls was only 3 percent in each direction. It was also found that the resistance of the paper to penetration by grease was materially improved.

*Example 3*

The unsized kraft paper of Example 2 was treated with a stabilized colloidal silica solution prepared as described in Example 2 except that the solution was used exactly as it came from the ion exchanger and without subsequent concentration. Thus, the silica solution used contained 2 percent $SiO_2$ by weight.

In this solution the paper was treated by dipping for five minutes, the saturated paper was run through squeeze rolls so adjusted that the pick-up of solution was equal to the weight of the dry paper, and the paper thus treated was dried at 100° C. It was found that the paper had picked up 3.76 percent of its original weight of $SiO_2$.

On the laboratory tensile strength tester it was found that after soaking for two minutes in water the wet strenght in the machine direction was 32 percent of the original dry strength and in the cross direction was 26 percent of the original dry strength, whereas the untreated controls had strengths of 3 to 4 percent in each direction.

It is found that paper treated as above described has substantially improved surface characteristics. For instance, the resistance of such treated paper to scuffing is increased, the amenability of the paper to receive surface treatment is increased, and the penetration of the surface by non-polar materials such as petroleum oils is decreased.

The foregoing improvements are observed with various kinds of cellulosic paper. For instance, the impregnation may be applied to such papers as sized and unsized kraft, sulfite papers, paper toweling, bank-note paper and similar papers.

I claim:

1. In a process for treating fibrous cellulosic paper the steps comprising impregnating the paper with an aqueous colloidal silica sol containing combined sodium in a silica:$Na_2O$ weight ratio of about from 10:1 to 100:1 and in which the silica particles have an ultimate particle size of about from 10 to 30 millimicrons and evaporating the sol to dryness in contact with the paper, whereby the silica is irreversibly attached to the fibers of the paper.

2. Paper having dispersed therethrough and attached to the individual fibers thereof silica particles having an ultimate particle size of from 10 to 30 millimicrons, the silica being combined with sodium in an $SiO_2$:$Na_2O$ weight ratio of from 10:1 to 100:1.

References Cited in the file of this patent

UNITED STATES PATENTS 2,577,485   Rule _____ Dec. 4, 1951